(12) United States Patent
Greenstein et al.

(10) Patent No.: US 7,739,122 B2
(45) Date of Patent: Jun. 15, 2010

(54) COLLECTION AND ANALYSIS OF MEASUREMENT DATA ASSOCIATED WITH SERVICE ELEMENTS

(75) Inventors: Paul G. Greenstein, Croton-on-Hudson, NY (US); Gregory Leytes, West Milford, NJ (US); Luu Q. Nguyen, Culver City, CA (US)

(73) Assignee: International Business Machines Corporation, Armonk, NY (US)

( * ) Notice: Subject to any disclaimer, the term of this patent is extended or adjusted under 35 U.S.C. 154(b) by 1772 days.

(21) Appl. No.: 10/262,984

(22) Filed: Oct. 1, 2002

(65) Prior Publication Data

US 2003/0195761 A1  Oct. 16, 2003

Related U.S. Application Data

(63) Continuation-in-part of application No. 10/121,307, filed on Apr. 12, 2002, now Pat. No. 7,533,026.

(51) Int. Cl.
*G06Q 99/00* (2006.01)
(52) U.S. Cl. ...................................... 705/1.1
(58) Field of Classification Search ............ 705/1, 705/1.1
See application file for complete search history.

(56) References Cited

U.S. PATENT DOCUMENTS

| | | | |
|---|---|---|---|
| 5,471,636 A | 11/1995 | Hauck | 395/800 |
| 5,646,676 A | 7/1997 | Dewkett et al. | 348/7 |
| 5,819,092 A | 10/1998 | Ferguson et al. | 395/701 |
| 5,909,581 A | 6/1999 | Park | 395/712 |
| 5,917,485 A | 6/1999 | Spellman et al. | 345/336 |
| 5,933,600 A | 8/1999 | Shieh et al. | 395/200.49 |
| 5,949,411 A | 9/1999 | Doerr et al. | 345/327 |
| 5,966,540 A | 10/1999 | Lister et al. | 395/712 |
| 6,064,813 A | 5/2000 | Sitbon et al. | 395/701 |
| 6,108,703 A | 8/2000 | Leighton et al. | 709/226 |
| 6,128,624 A | 10/2000 | Papierniak et al. | 707/104 |
| 6,151,601 A | 11/2000 | Papierniak et al. | 707/1 |
| 6,219,654 B1 | 4/2001 | Ruffin | 705/400 |
| 6,226,618 B1 | 5/2001 | Downs et al. | 705/1 |
| 6,247,020 B1 | 6/2001 | Minard | 707/104 |
| 6,427,230 B1 | 7/2002 | Goiffon et al. | 717/108 |
| 6,567,729 B2 * | 5/2003 | Betters et al. | 701/29 |
| 7,058,588 B2 | 6/2006 | Young et al. | 705/8 |
| 2003/0018511 A1 * | 1/2003 | Bicknell et al. | 705/9 |
| 2003/0033162 A1 * | 2/2003 | Houssiaux et al. | 705/1 |

OTHER PUBLICATIONS

Everett, Cath, "HP uses espeak to reposition itself as an Internet company," Newswire, May 19, 1999.

* cited by examiner

*Primary Examiner*—Jonathan Ouellette
(74) *Attorney, Agent, or Firm*—Anna Linne, Esq.; Kevin P. Radigan, Esq.; Heslin Rothenberg Farley & Mesiti P.C.

(57) ABSTRACT

Measurement data associated with a service element is obtained and analyzed to determine whether one or more aspects of the service element are to be revised. The data collected may be classified as standard, custom, or ad-hoc. Further, the measurement data can be collected for various areas associated with the service element, and may be maintained within a data structure. In one example, collection and analysis of the measurement data are facilitated by a Service Development Tool.

24 Claims, 9 Drawing Sheets

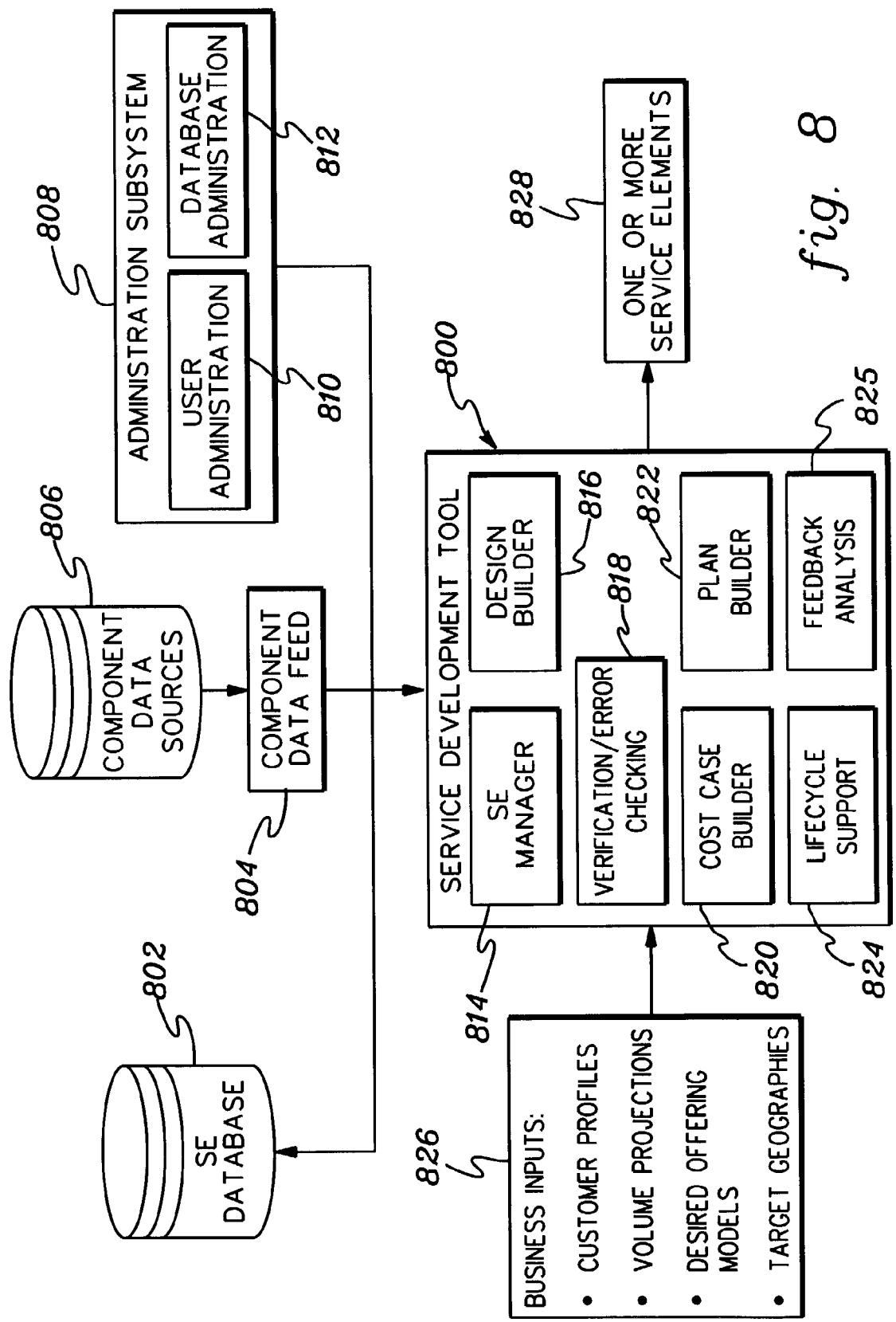

COLLECTION AND ANALYSIS OF MEASUREMENT DATA ASSOCIATED WITH SERVICE ELEMENTS

CROSS-REFERENCE TO CO-PENDING APPLICATIONS

This application is a continuation-in-part of U.S. patent application Ser. No. 10/121,307, filed Apr. 12, 2002, entitled "Facilitating Management of Service Elements Usable In Providing Information Technology Service Offerings", the entirety of which is hereby incorporated herein by reference.

Additionally, each of the following applications, which is assigned to the same assignee as this application, is hereby incorporated herein by reference in its entirety:

"A SERVICE DEVELOPMENT TOOL AND CAPABILITIES FOR FACILITATING MANAGEMENT OF SERVICE ELEMENTS", Greenstein et al., Ser. No. 10/121,290, filed Apr. 12, 2002;

"PACKAGING AND DISTRIBUTING SERVICE ELEMENTS", Paul G. Greenstein, Ser. No. 10/121,914, filed Apr. 12, 2002;

"FACILITATING ERROR CHECKING OF SERVICE ELEMENTS", Greenstein et al., Ser. No. 10/121,285, filed Apr. 12, 2002;

"FACILITATING HOSTING OF APPLICATIONS", Paul G. Greenstein, Ser. No. 10/121,075, filed Apr. 12, 2002; and "OPTIMIZING MANAGEMENT OF SERVICE ELEMENTS", Paul G. Greenstein, Ser. No. 10/121,311, filed Apr. 12, 2002.

TECHNICAL FIELD

This invention relates, in general, to service elements usable in providing information technology (IT) services, and in particular, to collecting and analyzing measurement data relating to the use of service elements.

BACKGROUND OF THE INVENTION

Services are provided in various ways. For example, services are provided in-house by a service provider or by a company itself, or are outsourced to a requesting customer. With the latter, a customer, such as a company, requests that a particular service be provided to the company. For instance, the company may request consulting services. With such a request, the company specifies the number of desired hours of labor and/or other requirements.

In order to purchase the number of hours of labor and/or other requirements, one or more service elements representing the requirements are created by the service provider and purchased by the company. This defines for the company what is provided and at what cost.

The development of a service element is performed based on assumptions made by a service element designer. Validity of those assumptions is ascertained based on empirical data collected in response to use of the service element. Therefore, a need exists for a capability that facilitates collection and analysis of measurement data usable, for instance, to tune and adjust future versions of service elements.

SUMMARY OF THE INVENTION

The shortcomings of the prior art are overcome and additional advantages are provided through the provision of a method of validating service elements. The method includes, for instance, obtaining measurement data relating to one or more parameters of a service element; and automatically determining, based on the measurement data, whether a change is to be made to at least one aspect of the service element.

In one example, at least one parameter of the one or more parameters is associated with at least one area including at least one of deployment, delivery and lifecycle.

In a further example, the measurement data is classified as one of a standard, custom or ad-hoc measurement.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 8 depicts one example of a Service Development Tool used in accordance with an aspect of the present invention.

BEST MODE FOR CARRYING OUT THE INVENTION

In accordance with an aspect of the present invention, a feedback capability is provided, in which data is collected, in response to using one or more service elements, analyzed and used to, for instance, tune and adjust future versions of the service elements.

As one example, a service element (SE) is a discrete entity for which a customer may be billed and/or which represents an in-house or outsourced service. A service element includes one or more components and/or one or more other service elements. A service element may be an intermediate building block to a service offering or may be the service offering itself. Service elements are described in further detail in the above referenced applications, each of which is hereby incorporated herein by reference in its entirety.

Figure 1:
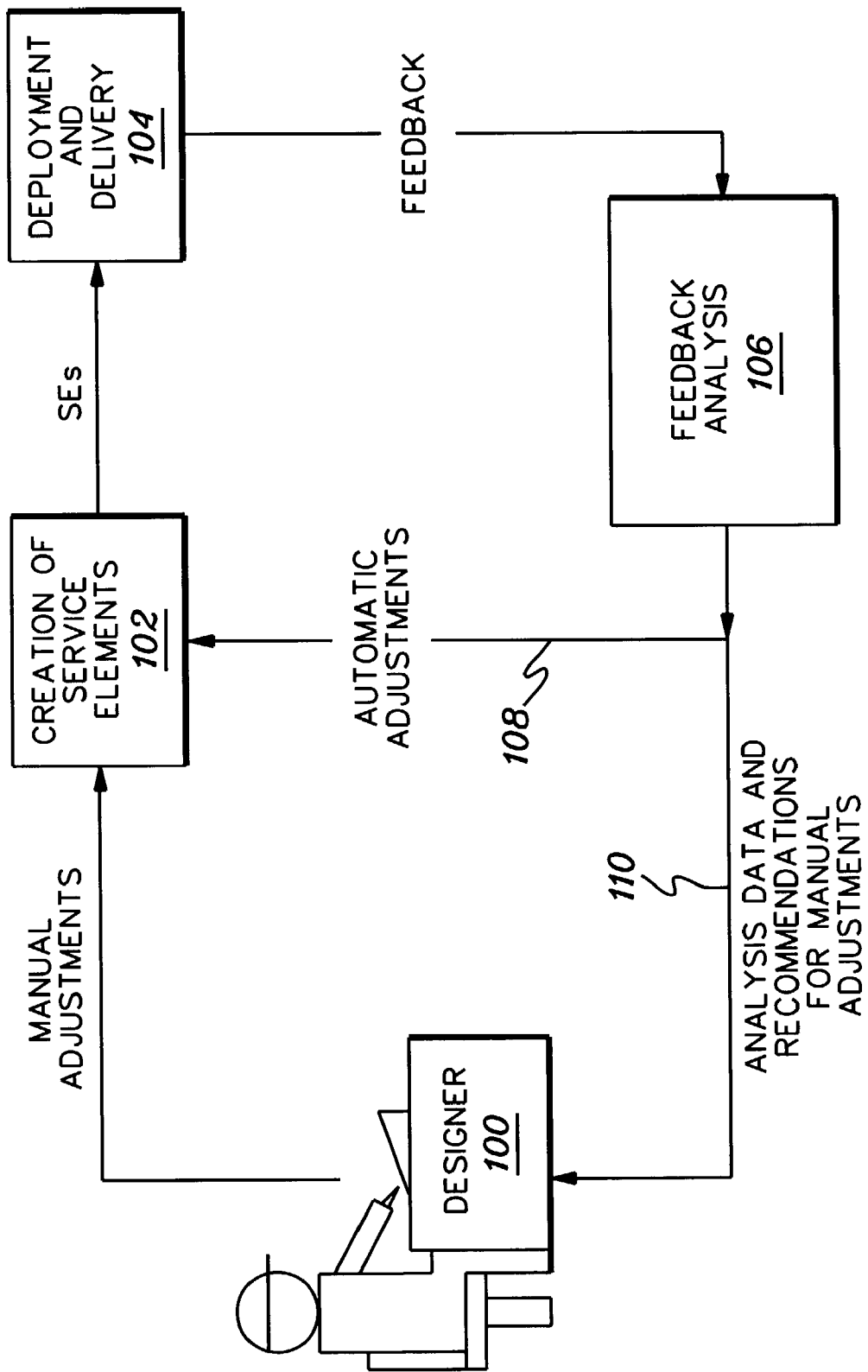
FIG. 1 depicts one embodiment of an overview of the collection and analysis of measurement data associated with service elements, in accordance with an aspect of the present invention.

In order to facilitate the development of a service element, a feedback capability is provided, in accordance with an aspect of the present invention. One embodiment of an overview of the feedback capability is described with reference to FIG. 1. As one example, a designer 100 creates and/or updates 102 one or more service elements. The created and/or updated service elements are then deployed and delivered 104. In response to deployment and/or delivery of the service elements, data is gathered and analyzed 106. Based on this analysis, adjustments are applied to service elements either automatically 108 by, for instance, a tool, or manually 110 by, for instance, designer 100.

The data collected in response to use (e.g., deployment, delivery, etc.) of a service element is defined by a measurements nomenclature, an example of which is depicted in the following table:

|  | STANDARD | Default Action for Standard | CUSTOM | AD-HOC |
|---|---|---|---|---|
| deployment | duration of deployment | automatic |  |  |
|  | cost of deployment | automatic |  |  |
| delivery | operational cost | automatic | availability | availability |
|  |  |  | help desk activity volume | help desk activity volume |
|  |  |  | duration of help desk calls | duration of help desk calls |
| lifecycle | version longevity | manual |  |  |
|  | sales volumes | automatic |  |  |
|  | customer retention | automatic |  |  |

As shown in the table, in one example, the measurement data is classified into three categories: standard (collected for all service elements), custom (collected for a particular service element), or ad-hoc (measurements not originally planned by a service element designer, but viewed as useful at some moment in the lifecycle of a service element and introduced at that time, without any additional changes to the subject service element). Further, the measurement data may be collected in one or more areas, including, for instance, deployment, delivery and lifecycle, depending, in this example, on the category. Additional details regarding classification of the measurement data are described below.

As one example, standard measurements include information relevant for all service elements, no matter the classification, characteristics, usage, geography, availability, etc. The interpretation of standard measurements is uniform across the set of service elements. For standard measurements, data may be collected, for instance, in the areas of deployment, delivery and lifecycle. As examples, the type of information collected for the deployment area is duration of deployment and cost of deployment. Similarly, the information collected for delivery is the operational cost (per standard time period); and the information collected for lifecycle includes version longevity (e.g., how long a service element version is active before being replaced by the next version), sales volume and customer retention, as examples.

In one embodiment, the standard measurements include a default action to be taken in response to analyzing the collected measurement data, as explained further below. This default action includes, for instance, an automatic action or a manual action, as described below.

For custom measurements, in one example, information is collected in the area of delivery, and includes, for instance, availability, help desk activity volume and duration of help desk calls. Similarly, for ad-hoc measurements, in one example, information is collected in the area of delivery, and includes, availability, help desk activity volume and duration of calls.

Figure 2:
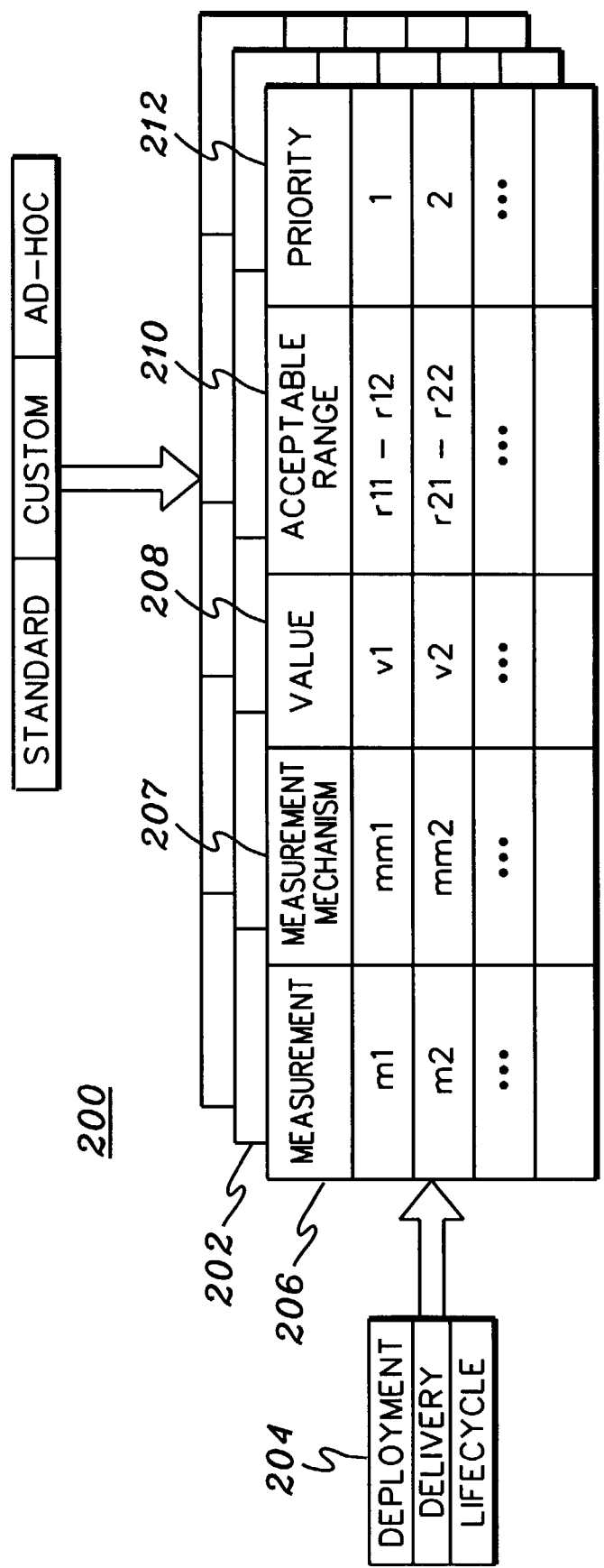
FIG. 2 depicts one embodiment of a data structure used to maintain the measurement data, in accordance with an aspect of the present invention.

The data that is collected for a service element is stored in a data structure. As one example, there is a data structure for each service element. In particular, in one example, measurement data is collected for all deployment instances of a particular service element and stored in the data structure for that instance. This relationship is made by, for instance, embedding a reference to the measurement data structure in a SE data structure representing the service element. One example of a data structure used to hold the measurement data is depicted in FIG. 2 and described below.

In one embodiment, a data structure 200 includes information for one or more instances 202 of a particular service element. The areas for which data is collected include, in this example, deployment, delivery and/or lifecycle 204. The data structure has a plurality of columns including, for instance, a name column 206 indicating the name of a measurement; a measurement mechanism 207 identifying a mechanism to be used to collect the data; a collected value 208 for that measurement; an acceptable range for the measurement 210, which is optional; and a priority value 212, which is also optional. The priority is assigned for breaking ties between changes, as described further below.

Figure 3:
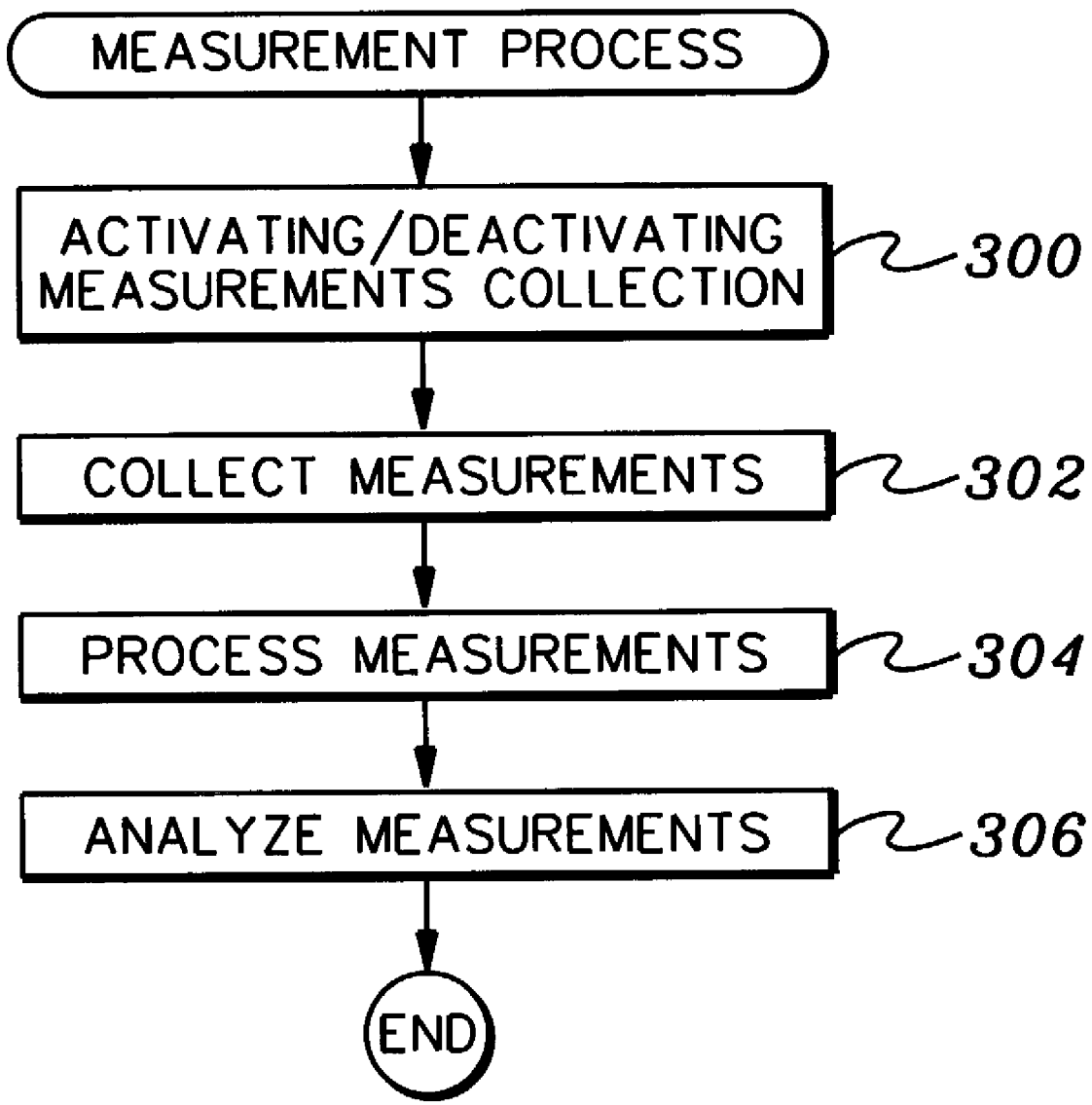
FIG. 3 depicts one embodiment of the logic associated with a measurement process used in accordance with an aspect of the present invention.

One embodiment of an overview of the measurement process of an aspect of the present invention is described with reference to FIG. 3. Initially, measurement collection is activated/deactivated, STEP 300. That is, collection of specified measurements for deployed instances of a given service element may be in one of the following states: dormant (inactive); active for standard measurements only; or active for all measurements. Collection is dormant until the first instance of the service element is deployed (e.g., the service element becomes a working element) and the deployment completes successfully. Collection is then activated for standard measurements only or for all measurements (or, in another example, for defined measurements) of the service element. The activating includes starting an identified mechanism to collect the data (e.g., invoking a user exit that executes a program to collect the desired data). When the last deployed instance of the service element is taken out of production, collection of measurements from the service element is terminated.

In response to activating the measurement collection, measurements are collected, STEP 302. The data that is collected is based, at least in part, on the classification category and/or the type of information identified to be collected. As examples, collection may be performed by existing performance monitors or space monitors. Further, collection may include tracking time associated with deployment, etc. Other collection mechanisms may also be used, including, but not limited to, writing a program to collect the desired data (e.g., extract the data from a database).

In response to obtaining measurements, one or more processes may be applied to the measurements, STEP 304. As one example, the collected data may be normalized. Examples of normalization techniques are described in, for instance, *Oracle8: The Complete Reference,* by G. Koch and K. Loney, Osborne/McGraw-Hill, (c) 1997, ISBN 0-07-88262396-X; at URL http://www.datamodel.org/NormalizationRules.html; and at URL http://www.finsinc.com/tpapers/datanorm/#Data Normalization Overview; the content of each being hereby incorporated herein by reference in its entirety.

In a further example, data returned from the measurement collection mechanism may be filtered (e.g., based on its veracity, completeness, relevance, volume, etc.). For example, it may be desirable to sample data based on its volume being too high, rather than accept every data item. As a further example, it may be desirable to ascertain data veracity by performing checks on algorithms against the collected data. As yet a further example, it may be desirable to correlate measurements with some other information and discard everything that does not correlate to ensure relevance. Examples of filtering mechanisms are described at, for instance, URL http://www.macromedia.com/desdev/articles/easy_sql.html; URL http://tutorials.beginners.co.uk/read/query/Access% 202000/id/255; and URL http://www.its.queensu.ca/educ/handout/excelsorting. html#filter; the content of each being hereby incorporated herein by reference in its entirety.

Subsequent to collecting the data and applying zero or more processes to the collected measurements, the measurements are analyzed, STEP 306, as described further below. In response to this analysis, zero or more actions are taken.

Figure 4:
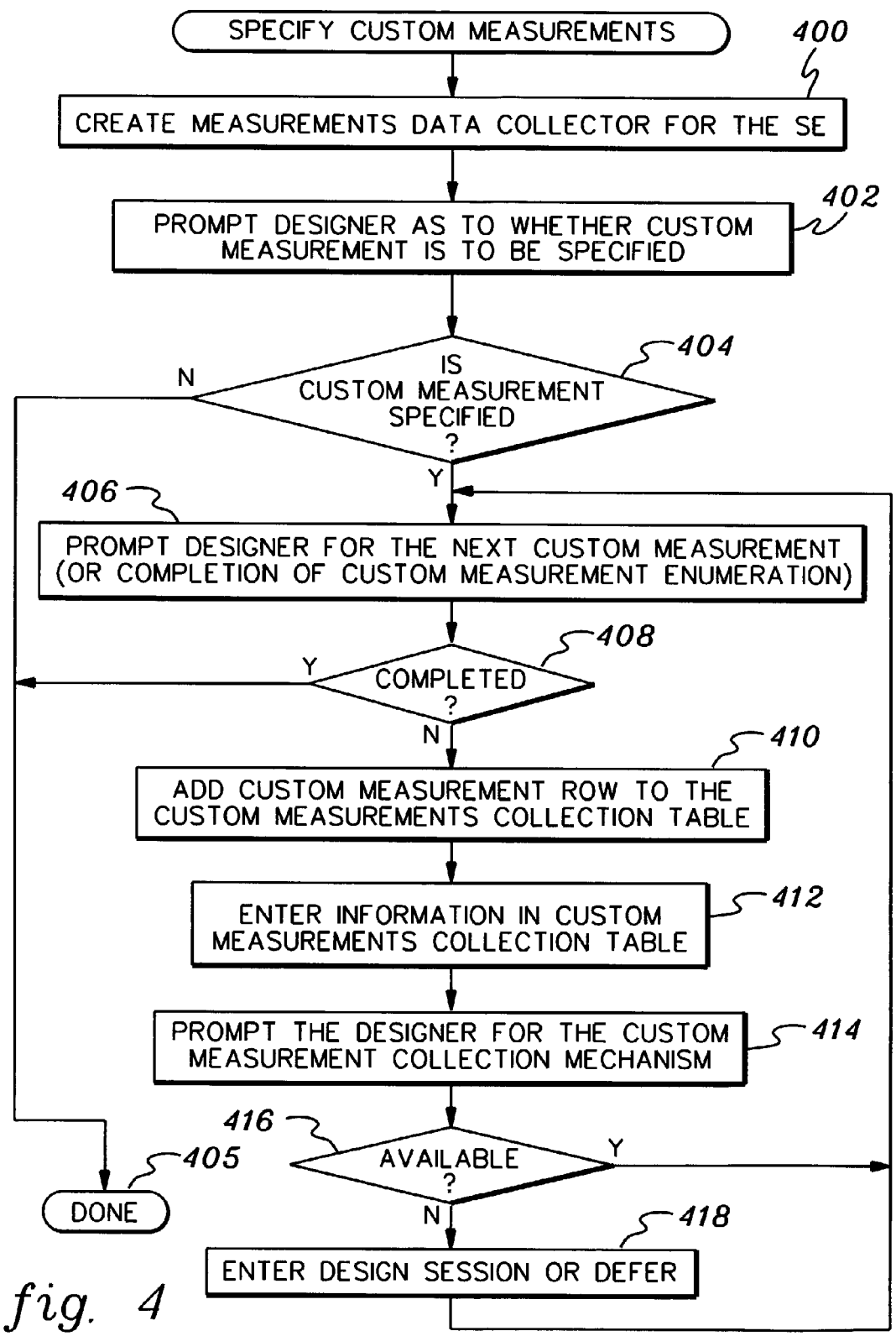
FIG. 4 depicts one embodiment of the logic associated with specifying custom measurements, in accordance with an aspect of the present invention.

In one aspect of the present invention, in order to collect custom measurement data, custom measurements are to be specified. In one example, one or more desired custom measurements are created at the time of service element development and specified as part of the service element deployment sequence. One embodiment of the logic associated with specifying custom measurements for a service element is described with reference to FIG. 4.

Initially, a measurement data collector for the service element is created, STEP 400. This includes, for instance, allocating space for the collected data, including space for the standard measurements. Thereafter, the SE designer is prompted for an indication as to whether a custom measurement is to be specified, STEP 402. If a custom measurement is not to be specified, INQUIRY 404, then processing is complete, STEP 405. However, if a custom measurement is to be specified, then the designer is prompted for the next custom measurement (or completion of custom measurement enumeration), STEP 406.

If specification of the custom measurement is complete, INQUIRY 408, then processing is complete, STEP 405. Otherwise, processing continues with adding a custom measurement row to the custom measurements data structure, STEP 410. Further, information is entered into the added row of the custom measurements data structure, STEP 412. For example, a custom measurement name is entered into the measurement name column; and if desired, a range is added into the range column and/or a priority is provided.

Additionally, the designer is prompted for an identification of the mechanism to be used to collect the data for the specified custom measurement, STEP 414. In response to the specification of a mechanism, a determination is made as to whether the specified collection mechanism is available, INQUIRY 416. Should the designer indicate that the specified mechanism is available (either externally or in the design of the target service element), then the mechanism is added to the data structure, and processing continues with the next iteration, STEP 406. Otherwise, the designer is given a choice of deferring the specification of the measurement mechanism (e.g., the mechanism column of the newly created row will be filled in later) or entering a design session to add the measurement mechanism to the target service element design and add an indication of the mechanism to the data structure, STEP 418. The process then iterates to the next custom measurement specification at STEP 406.

Similar to creating custom measurements should custom measurements be desired, if ad-hoc measurements are desired, then those measurements are also to be established. As described above, ad-hoc measurements are those not originally planned by a service element designer, but viewed as useful at some moment in the lifecycle of the service element and introduced without any additional changes to the subject service element. Consider an example. The designer of SE A has not deemed it necessary to measure availability of SE A, assuming it to be non-critical to the nature of SE A. However, in the design of SE A, component C has been included, which brings availability of SE A down unexpectedly and in a significant number of cases (e.g., component C is a machine, the producer of which did not properly design the cooling subsystem and the machine overheats). The SE A designer, upon receiving complaints from delivery about SE A availability, may impose an ad-hoc availability measurement of SE A to track availability and demonstrate the problem, followed by problem determination and changing the design of SE A to include a replacement for component C, which does not cause a problem.

In one embodiment, ad-hoc measurements assume the existence of an established measurement mechanism. If such a mechanism does not exist, it is established by a design change to the target service element followed by appropriate implementation, thus making this measurement custom, rather than ad-hoc. One example of implementing design changes is described in the above-referenced applications, each of which is hereby incorporated herein by reference in its entirety.

Figure 5:
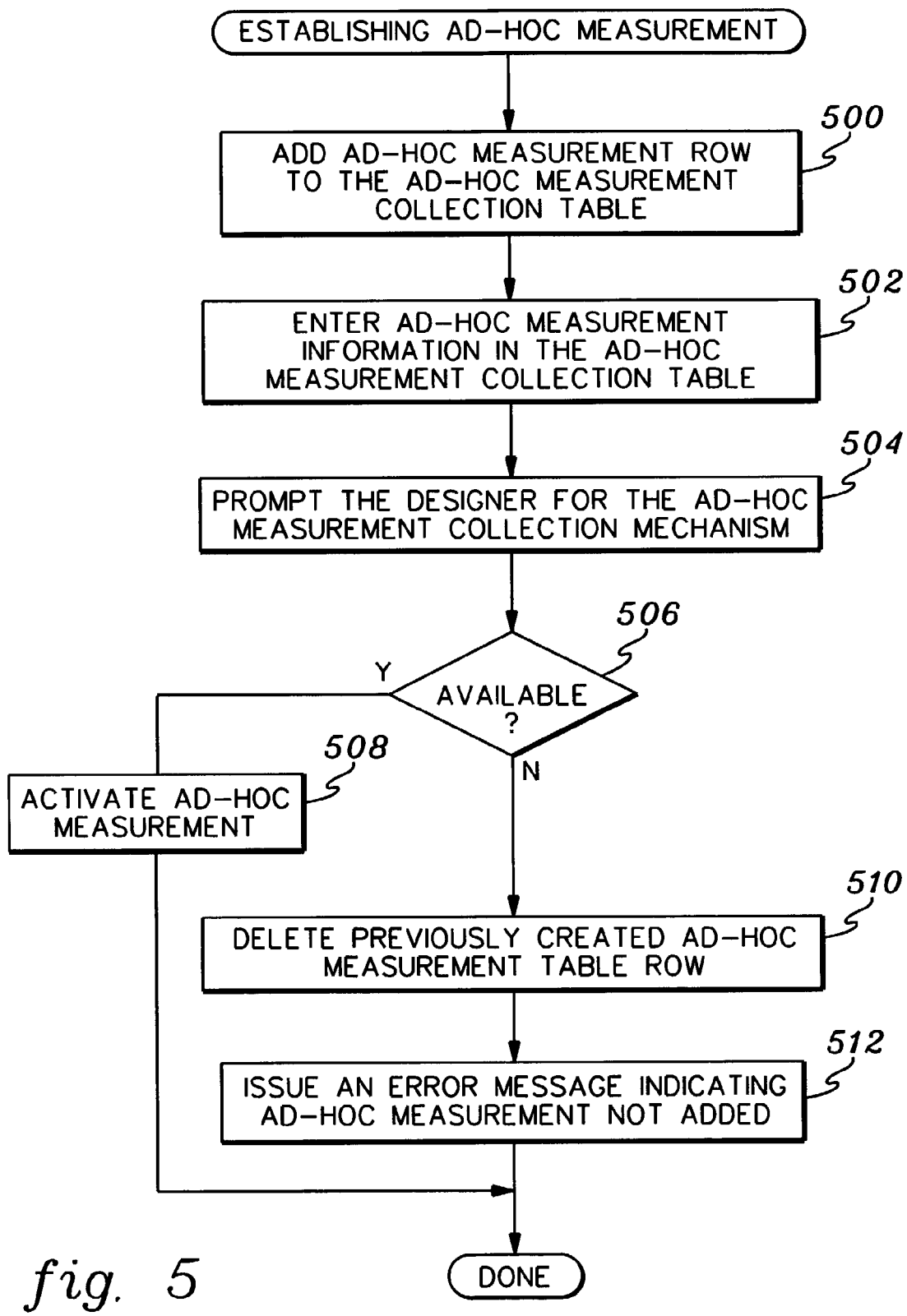
FIG. 5 depicts one embodiment of the logic associated with establishing ad-hoc measurements, in accordance with an aspect of the present invention.

One embodiment of the logic associated with imposing an ad-hoc measurement on a service element is described with reference to FIG. 5. In response to the designer signaling a desire to impose an ad-hoc measurement on a service element, an ad-hoc measurement row is added to the ad-hoc measurement data structure associated with the target service element, STEP 500. Thereafter, ad-hoc measurement information is entered in the ad-hoc measurement data structure, STEP 502. For example, the ad-hoc measurement name is entered into the name column; and possibly, a value range and/or priority is provided.

Additionally, the designer is prompted for the ad-hoc collection mechanism specification, STEP 504. If the mechanism is available, then identification of the mechanism is added to the row, and the ad-hoc measurement is activated, (e.g., a user exit is invoked to run a measurement program), STEP 508. Otherwise, the previously created row is deleted, STEP 510, and an error message indicating that the ad-hoc measurement was not added is issued to the designer, STEP 512.

Figure 6:
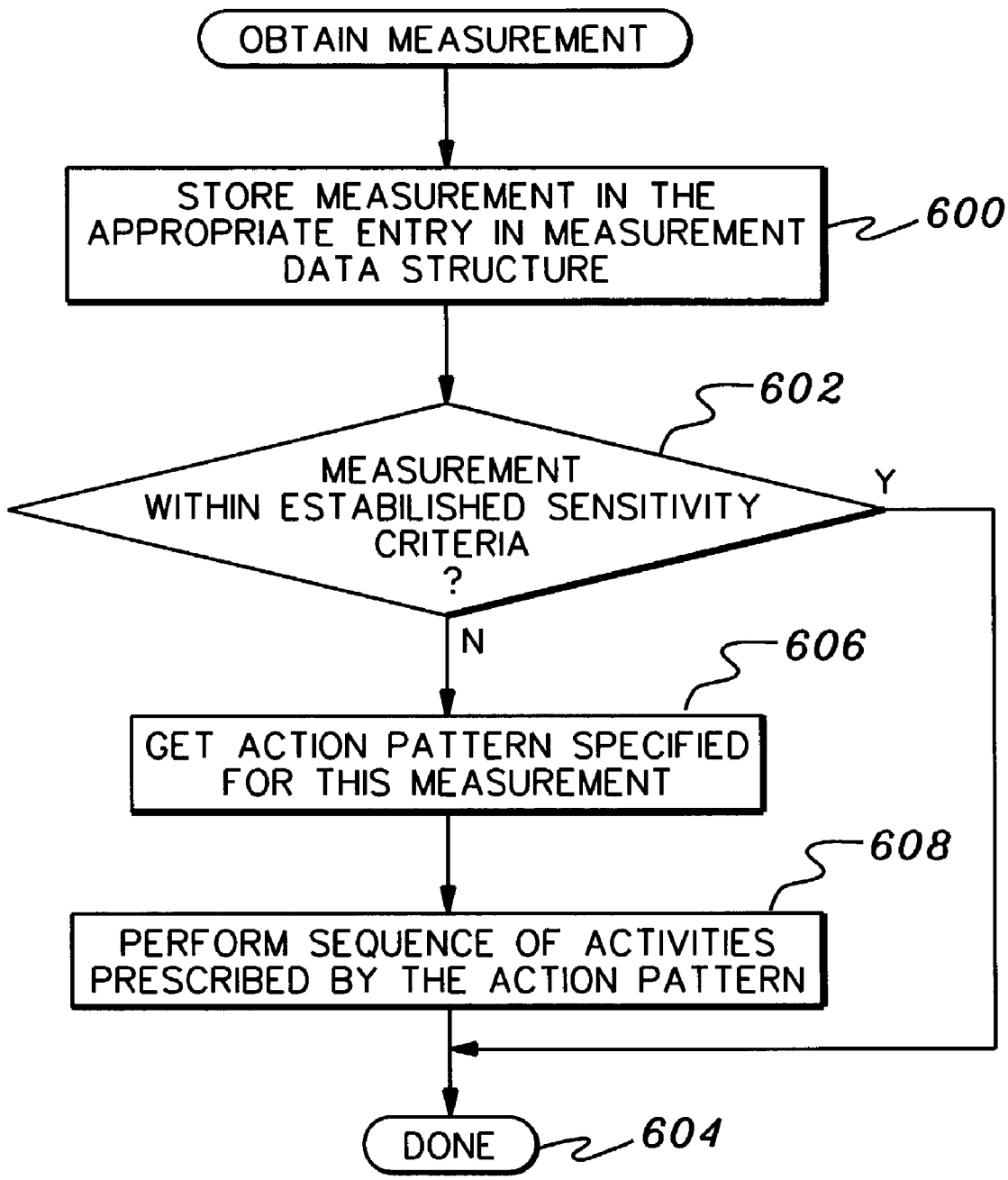
FIG. 6 depicts one embodiment of the logic associated with an overview of processing collected measurement data, in accordance with an aspect of the present invention.
Figure 7A:
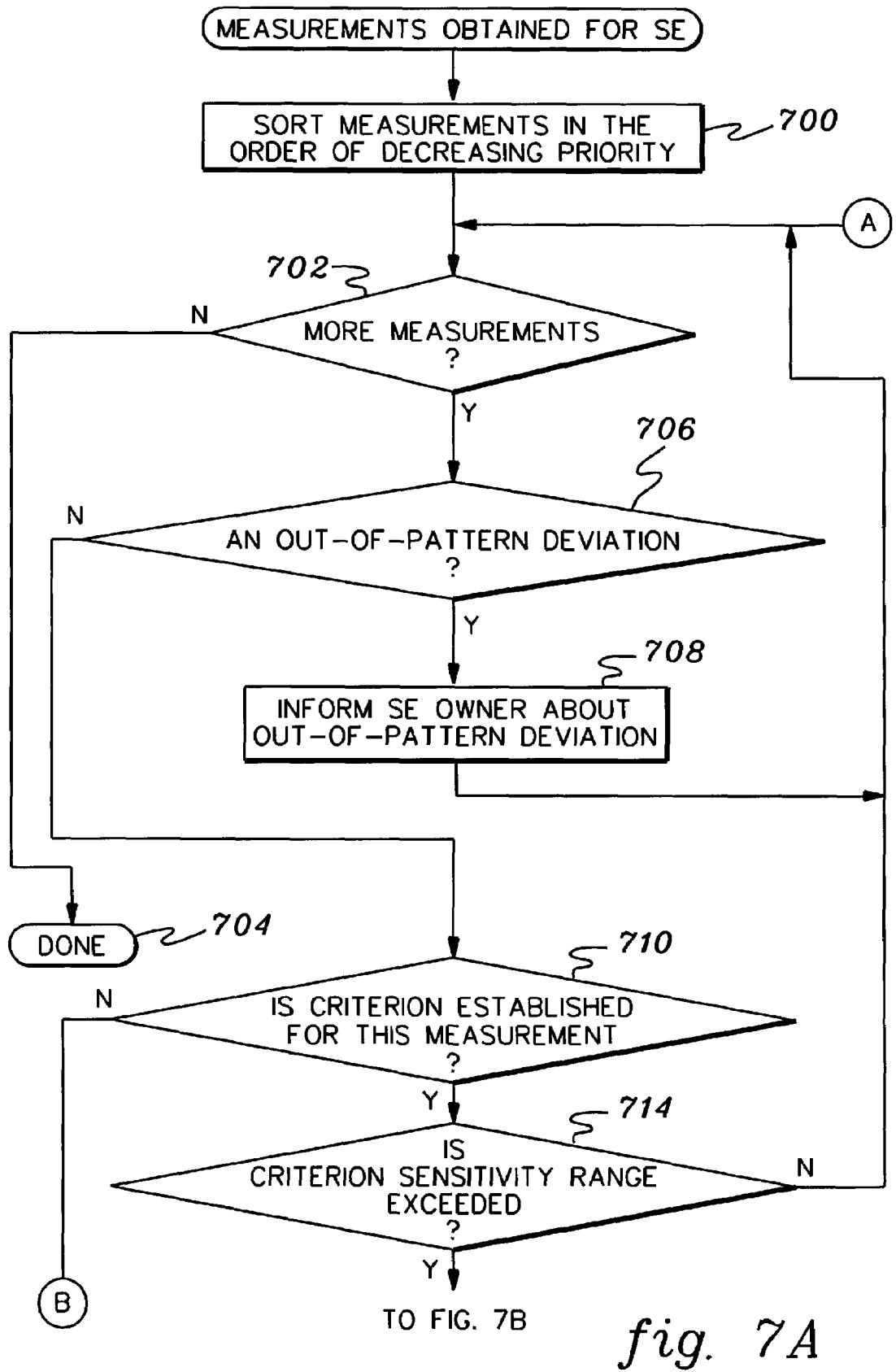
FIGS. 7a-7b depict a further embodiment of processing collected measurement data, in accordance with an aspect of the present invention.

Processing associated with collecting measurement data is further described with reference to FIGS. 6, 7*a* and 7*b*. Referring initially to FIG. 6, when a particular measurement is obtained, (e.g., collected, provided, generated, have), the measurement is stored in the appropriate entry of the measurement data structure, STEP 600. Thereafter, a determination is made as to whether the measurement is within an established sensitivity criteria, INQUIRY 602, assuming such a criteria is provided. That is, for each measurement, a range of acceptable values may be established, indicating how far an actual measurement may deviate from a projection made by the SE designer before it should trigger an action. For example, if the projected sales volume for an SE is 1000 instances/year, the SE designer may indicate that a deviation of 10% in either direction from the projected number is not to be considered meaningful, but any deviation in excess of 10% should trigger an action.

Should the measurement be within the established sensitivity criteria, then processing is complete, STEP 604. However, if the measurement is not within the established sensitivity criteria, then an action pattern specified for this measurement is obtained, STEP 606. For example, when an action is triggered by a measurement deviating from an established criteria, one of the following action patterns is performed: automatic, automatic/controlled or manual, each of which is described herein. Subsequent to identifying the appropriate action pattern, a sequence of activities prescribed by the action pattern is performed, STEP 608.

For example, when an automatic action pattern is active, the service element is automatically updated (e.g., by a tool) by replacing the service element designer projection for the particular measurement with the actual data received. Further, an error check is performed. If the error check is successful, the tool stores the updated version of the modified service element and informs the SE owner of the same. However, if the error check is unsuccessful, the tool discards the change it attempted to apply to the service element, and instead, forwards the attempted change specification to the SE owner, along with the error check messages received.

Consider the following example. Assume the projected sales volume for SE A is 1000 instances/year, the specification of meaningful deviation is 10%, and the actual measurement is 800 instances/year. Further, assume that the action pattern for this measurement is automatic. Initially, the tool tries to update the SE A sales volume projection to 800 instances/year, and then runs an error check upon replacement of the projection in SE A. The error check may show that the business case for SE A is still valid (in which case, the SE A owner is notified of the changed performed). Alternatively, the error check may show that the business case for SE A is no longer valid, in which case the tool discards the change it attempted to perform and forwards to the SE A owner the recommendation to change SE A sales volume projection from 1000 instances/year to 800 instances/year and the error message it received as a result of an attempt to apply this change. The SE A owner may then make a decision based on this information.

When a manual action pattern is active, this indicates that information is simply to be provided to the SE owner. Further, an automatic/controlled action pattern indicates that a recommended update to the SE owner is to be provided. The owner then determines whether an update is desired (e.g., by manually applying the change, performing an error check and observing results).

Default assignments of action patterns to various standard measurements may be provided, as shown in the above table. In one example, a manual action pattern is a default for any custom or ad-hoc measurement. The owner of a service element may override the default action pattern settings. For example, the owner may replace an automatic action pattern for a particular measurement with a manual or automatic/controlled pattern.

Further details regarding processing relating to obtained measurements for a service element are described with reference to FIGS. 7*a*-7*b*. Referring initially to FIG. 7*a*, in one embodiment, when one or more measurements are obtained for a particular service element, those measurements are sorted in the order of decreasing priority, STEP 700. Thereafter, an iteration through the measurements is performed. For instance, a determination is made as to whether there are measurements to be processed, INQUIRY 702. If there are no measurements to be processed, then processing is complete, STEP 704. However, if there is at least one measurement to be processed, then a further inquiry is made as to whether an out-of-pattern deviation has been detected, INQUIRY 706.

An out-of-pattern deviation is a deviation generated when one or more instances of a service element do not fit within the pattern of the other service element instances. For instance, assume that a majority of measurements for a set of identical service element instances fall within a particular deviation pattern, but some of the service element instances generate abnormal measurements that do not fit within that pattern, these are called out-of-pattern deviations. For example, assume service element (SE) A is measured on its availability. If all instances of SE A are operating within 1% of the 99% availability target criteria, except for one instance of SE A, A1, which is showing 70% availability and falling out of range, then an out-of-pattern deviation is detected.

When an out-of-pattern deviation is observed, it is brought to the attention of the SE owner, STEP 708, and processing continues with INQUIRY 702. In response to being informed of the out-of-pattern deviation, the SE owner may initiate problem determination to ascertain the cause of uncharacteristic behavior of a particular SE instance. In the above example, upon investigation, it may become apparent that A1 was not properly deployed (in which case a proper redeployment may remedy the problem); that A1 includes a faulty component (in which case, component replacement may remedy the problem); or A1 is used differently from other instances of SE A, in a manner unforeseen by the SE designer (therefore, a design effort is to be initiated to remedy the problem).

If there is no out-of-pattern deviation, INQUIRY 706, then processing continues with determining whether a criterion sensitivity range has been established for this measurement, INQUIRY 710. If a criterion sensitivity range has not been established, then processing continues with performing a manual action pattern, STEP 712 (FIG. 7*b*). On the other hand, if a criterion sensitivity range has been established for this measurement, INQUIRY 710 (FIG. 7*a*), then a determination is made as to whether this criterion sensitivity range has been exceeded, INQUIRY 714.

If the criterion sensitivity range has not been exceeded, then processing continues with INQUIRY 702. Otherwise, a determination is made as to whether an automatic pattern is specified, INQUIRY 716 (FIG. 7*b*). Should an automatic pattern not be specified, then a further determination is made as to whether an automatic/controlled pattern is specified, INQUIRY 718. If not, then a manual action pattern is performed, STEP 712, and processing continues with INQUIRY 702 (FIG. 7*a*).

Figure 7B:
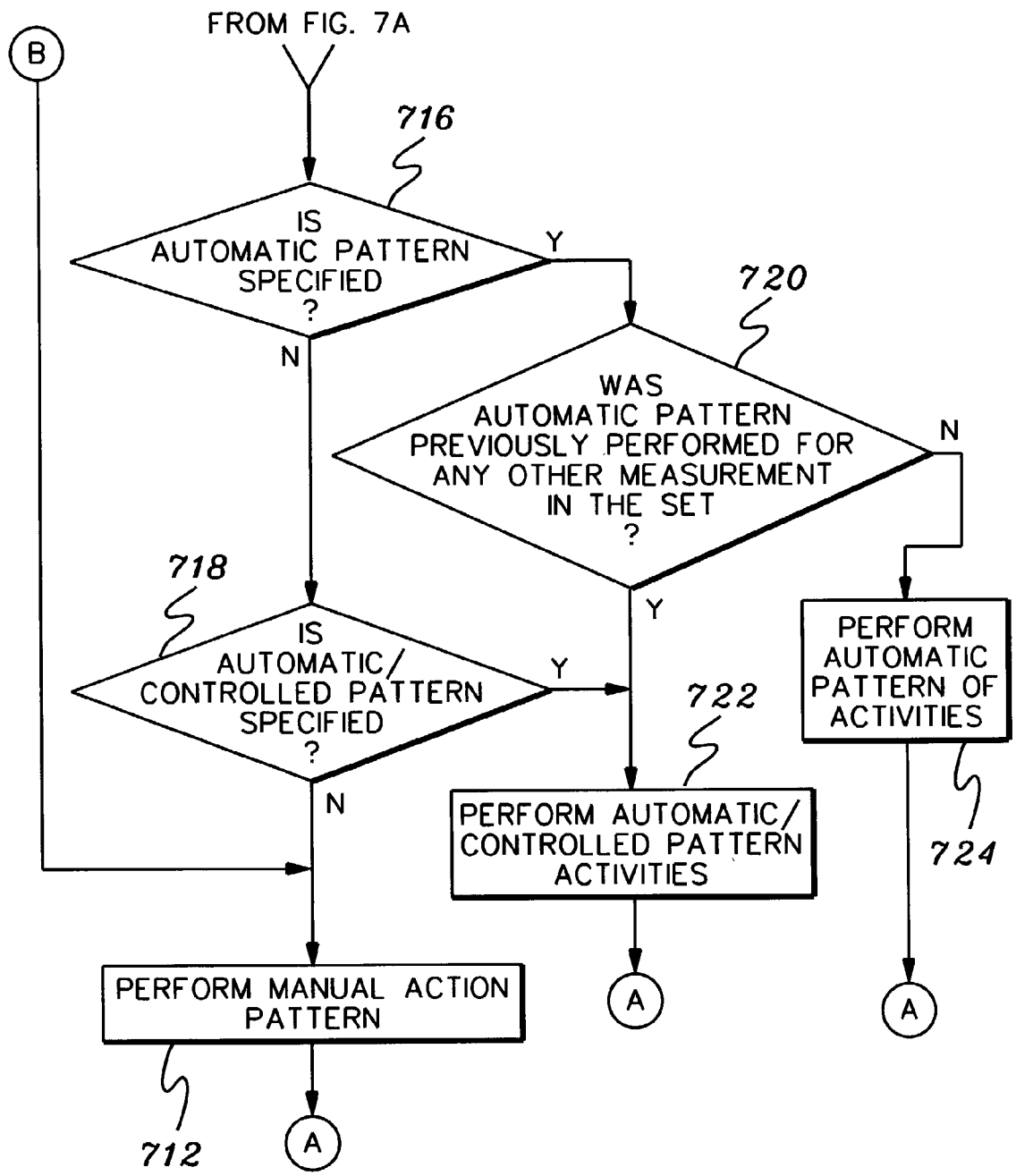

On the other hand, if the automatic pattern of activities has been specified for this measurement, then a check is made as to whether the automatic pattern was previously performed in the course of a previous iteration on this set of measurements, INQUIRY 720 (FIG. 7*b*). If so, then instead of the automatic pattern, an automatic/controlled pattern of activities is performed, STEP 722, and processing continues with INQUIRY 702 (FIG. 7*a*). However, if an automatic pattern was not previously performed in the course of a previous iteration through the set of measurements, then an automatic pattern of activities is performed, STEP 724 (FIG. 7*b*), and processing continues with INQUIRY 702 (FIG. 7*a*).

In one embodiment, it may be that an automatic action taken by, for instance, the tool, or a manual action performed by, for instance, the designer, instead of or in addition to remedying the original problem, has a side effect detrimental to the operation of the service element resulting in another measurement indicating a need for corrective action. For example, assume SE A availability was insufficient, and was improved by introducing redundant components. Further, assume that when the change was made, performance of SE A decreased. The reaction to the decreased performance of SE A may be eliminating redundant components in SE A, thus bringing back the original problem.

Furthermore, it may be that more than one measurement for a particular SE indicates a need for a change, and it is not clear which one is more important. Multiple simultaneous changes to a SE may, instead of improving the situation, counteract each other, or have other undesirable side effects, which are going to be hard to ascertain due to a multitude of changes. Thus, in one example, the change is limited to a single item and others are postponed, since they may become unnecessary once the first change takes place. As one example, two mechanisms are available for limiting unproductive changes: establishing priority of measurements, and detection of repeating changes.

Priority of measurements can be established by the SE designer such that, if two measurements indicate a need for a change simultaneously, only the change triggered by the measurement with the higher priority takes place and any lower priority changes are postponed until the next measurement cycle. Thus, possible effects of multiple simultaneous changes to a service element are avoided. If the designer has not established priority of measurements, then upon encountering the need to perform more than one change, at least one involving the automatic action pattern, a switch is made (e.g., by the tool) to an automatic/controlled action pattern, and the SE designer then makes the determination of the desired change(s).

In one example, a history of the changes performed by the automatic action pattern is kept by, for instance, the tool. For instance, a history of the changes that have been performed since the last manual intervention is maintained, and upon determination of the next automatic change, a check is provided to verify the new change against the previous set of changes. If the change affects a parameter that was previously changed, with the direction of change opposite to a previous one, a switch is made (e.g., by the tool) from automatic to an automatic/controlled action pattern and the SE designer is informed about the reason for the switch. For example, if at time 1, the automatic change performed to an SE is to increase a value of parameter P from N to N+10, and then at time 1+n, the automatic change to be performed is identified as decreasing the value of parameter P from N+10 to anything lower, this change is not performed, but instead, it is recommended to the SE designer, with a message indicating that this is a reversal of a previous change, and the designer is to evaluate the usefulness of this change.

In one embodiment, one or more aspects of the feedback capability of the present invention are included as part of a Service Development Tool (SDT). The Service Development Tool facilitates management of service elements and minimizes the efforts required to design, implement and document solutions. It further enables aspects of the data collection, analysis and response of the feedback capability of the present invention to be automatically performed. Although, in one example, the feedback capability is part of the Service Development Tool, in another example, the feedback capability is provided apart from the Service Development Tool. The logic of the feedback capability can be executed on a RS/6000 offered by International Business Machines Corporation, Armonk, N.Y., or an Intel Server, as examples.

One embodiment of a functional overview of a Service Development Tool is depicted in FIG. 8. As shown, in one example, input to a Service Development Tool 800 includes, for instance, logical collections of data, such as:

A Service Element (SE) database 802, including one or more packaged service elements and/or one or more templates; and A component data feed 804, providing component information from one or more disparate component information sources 806.

Moreover, the Service Development Tool is administered by an administration subsystem 808, which includes, for instance, a user administration unit 810 and a database administration unit 812. The administration functions include, for example, user administration and access control functionality, allowing the administrator to assign access roles to system users. The roles include, for example: developer, reviewer, offering manager, project manager, tester, and delivery personnel. Depending on the role, different functions can be performed by a user.

The SDT includes a variety of functional units, such as, for instance:

Service element manager 814, providing the ability to manage (e.g., construct—create and develop, delete, upgrade, track dependencies, provide reports, such as cross-references, provide search functions, release to production, etc.) service elements;

Design builder 816, providing the ability to produce graphical configuration diagrams;

Verification/error checking functionality 818, providing the ability to verify SE consistency/completeness, dependencies or relationships and business case;

Cost case builder 820, providing the ability to generate service element cost cases;

Plan builder 822, providing the ability to generate project plans, and to define development budgets;

Lifecycle support 824, providing the ability to track changes to dependencies, and, if appropriate, propagate changes through chains of dependencies among disparate SEs. Also, it informs about a deletion of an SE component and may recommend creating a new SE or finding a replacement component, if one of the containing SE components becomes unavailable; and Feedback analysis 825, providing the ability to collect and analyze measurement data relating to service elements, and to make adjustments to or provide recommendations for service elements.

The above functions can be used piecemeal or jointly, permitting creation of parts (e.g., service elements, offering templates) or whole service offerings. A set of initial business assumptions 826 is entered, including, for instance, customer profiles, customer volume projections, desired offering model(s), target geographies, etc. (As used herein, a customer includes an in-house customer and/or an outsourced customer.) Subsequent activities performed by a user include entering/selecting information, while interacting with the appropriate aspects of the tool. For example:

Selection of the appropriate template(s);

Creation of the technical design diagram(s), enumerating and identifying hardware elements and assumptions about them;

Selection of standard SEs required to package the offering;

Creation of new SEs; and

Identification of required standard documents to be produced, etc.

The above set of activities are performed to construct (e.g., create and develop) one or more service elements 828. As one example, the activities are performed as an iterative process, until a complete offering with satisfactory operational and cost characteristics over time is defined, including, for instance:

Technical design;
Cost case(s);
Development plan; and
Delivery documentation.

The construction of the service elements includes the use of one or more assumptions. These assumptions are validated based on data collected and analyzed. The relevant measurements may be gathered, analyzed, and used to tune and adjust future versions of service elements.

Further details regarding one example of a Service Development Tool are described in the above-referenced applications, each of which is hereby incorporated herein by reference in its entirety.

Described in detail above is a feedback capability that facilitates collection and analysis of measurement data usable in tuning and/or adjusting service elements. In one embodiment, measurement data relating to one or more parameters (e.g., deployment parameters, for a standard measurement, such as, e.g., duration and cost; delivery parameters for a standard measurement, such as, e.g., operational cost; and lifecycle parameters for a standard measurement, such as, e.g., version longevity, sales volume and customer retention) are obtained (e.g., collected, provided, generated, have). Then, based on the measurement data, an automatic determination is made as to whether a change is to be made to at least one aspect (e.g., a parameter, a component, a part, etc.) of the service element.

Although in the above example, various parameters are included, these are only examples. One or more aspects of the invention may include additional, less or different parameters. Further, additional, less or other categories of measurement may be included.

The measurement data is maintained in a data structure. Although one example of a data structure is provided herein, this is only one example. Other types of data structures may be used to maintain the data.

Further, although the measurement data is classified into three categories in the example herein, additional, less or different categories may be presented. Additionally, although one or more areas, each having one or more parameters, are provided for each classification, additional, less or different areas having one or more parameters may be provided.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of evaluating service elements, said method comprising:

selecting a measurement type from among a standard measurement type, a custom measurement type and an ad-hoc measure type, the selecting including identifying information to be collected;

collecting measurement data relating to one or more parameters of a service element responsive to the use of the service element and responsive to the selecting, the service element being a discrete entity for which a customer is to be billed and which represents a service, and includes a feedback capability, the measurement data comprising a plurality of data collection measurements, each data collection measurement of the measurement data being the standard measurement type, the custom measurement type or the ad-hoc measurement type pursuant to the selecting, wherein a standard measurement comprises information relevant across multiple service elements, a custom measurement comprises information relevant to only the particular service element being evaluated, and an ad-hoc measurement comprises information dynamically obtained on the service element during a lifecycle usage of the service element, the ad-hoc measurement being a data collection measurement type which is first specified after deployment of the service element without additional change to the service element, wherein the standard measurement type, custom measurement type and ad-hoc measurement type are distinct types of data collection measurements;

storing the measurement data for the service element in a data structure for the service element, including each measurement's classification;

automatically determining, based on the stored measurement data, whether a change is to be made to at least one aspect of the service element, the automatically determining comprising automatically determining whether a particular measurement of the measurement data is within a corresponding established acceptable range, and if not, automatically obtaining an action pattern pre-specified for the particular measurement, and automatically performing a sequence of predefined activities prescribed by the action pattern for the particular measurement; and wherein the action pattern is an automatic action pattern, and the sequence of predefined activities prescribed by the action pattern for the particular measurement comprise automatically updating a service element projection value for the particular measurement with the actual, particular measurement value, thereby automatically modifying the service element.

2. The method of claim 1, wherein at least one parameter of the one or more parameters is associated with at least one area including at least one of deployment, delivery and lifecycle.

3. The method of claim 1, wherein when multiple measurements of the measurement data are outside respective established acceptable ranges, the method further comprises:

sorting measurements of the measurement data based on a predefined measurement priority, and obtaining the action pattern for a single measurement of the multiple measurements, and performing the sequence of activities prescribed by the action pattern for the single measurement, and postponing the performing for at least one other measurement of the multiple measurements.

4. The method of claim 1, wherein when the measurement data is classified as a standard measurement, the method further comprises performing a default action, in response to the automatically determining.

5. The method of claim 1, wherein the measurement data is classified as a custom measurement, and the method further comprises pre-specifying one or more custom measurements for the service element.

6. The method of claim 1, wherein the measurement data is classified as an ad-hoc measurement, and the selecting comprises dynamically specifying one or more ad-hoc measurements for the service element during lifecycle usage of the service element.

7. The method of claim 1, wherein the collecting comprises collecting measurement data relating to one or more parameter of multiple service element instances, wherein each service element instance of the multiple service element instances is an instance of the same service element, and wherein the method further comprises identifying whether a service element instance comprises a measurement with an out-of-pattern deviation, and if so, informing the service element instance owner about the out-of-pattern deviation, wherein identifying an out-of-pattern deviation comprises comparing the measurement for the service element instance with corresponding measurements for multiple other service element instances and identifying the out-of-pattern deviation if the measurement deviates from the corresponding measurements by a defined amount.

8. The method of claim 1, wherein the selecting comprises selecting each of the measurement types and the collecting comprises collecting measurement data for each of the measurement types.

9. The computer system for evaluation service elements, the computer system comprising:
   a memory; and
   a processor in communications with the memory, wherein the computer system performs a method, the method comprising:
      selecting a measurement type from among a standard measurement type, a custom measurement type and an ad-hoc measure type, the selecting including identifying information to be collected;
      collecting measurement data relating to one or more parameters of a service element responsive to the use of the service element and responsive to the selecting, the service element being a discrete entity for which a customer is to be billed and which represents a service, and includes a feedback capability, the measurement data comprising a plurality of data collection measurements, each data collection measurement of the measurement data being the standard measurement type, the custom measurement type or the ad-hoc measurement type pursuant to the selecting, wherein a standard measurement comprises information relevant across multiple service elements, a custom measurement comprises information relevant to only the particular service element being evaluated, and an ad-hoc measurement comprises information dynamically obtained on the service element during a lifecycle usage of the service element, the ad-hoc measurement being a data collection measurement type which is first specified after deployment of the service element without additional change to the service element, wherein the standard measurement type, custom measurement type and ad-hoc measurement type are distinct types of data collection measurements;
      storing the measurement data for the service element in a data structure for the service element, including each measurement's classification;
      automatically determining, based on the stored measurement data, whether a change is to be made to at least one aspect of the service element, the automatically determining comprising automatically determining whether a particular measurement of the measurement data is within a corresponding established acceptable range, and if not, automatically obtaining an action pattern pre-specified for the particular measurement, and automatically performing a sequence of predefined activities prescribed by the action pattern for the particular measurement; and
      wherein the action pattern is an automatic action pattern, and the sequence of predefined activities prescribed by the action pattern for the particular measurement comprise automatically updating a service element projection value for the particular measurement with the actual, particular measurement value, thereby automatically modifying the service element.

10. The computer system of claim 9, wherein at least one parameter of the one or more parameters is associated with at least one area including at least one of deployment, delivery and lifecycle.

11. The computer system of claim 9, wherein when multiple measurements of the measurement data are outside respective established acceptable ranges, the method further comprises:
   sorting measurements of the measurement data based on a predefined measurement priority, and obtaining the action pattern for a single measurement of the multiple measurements, and performing the sequence of activities prescribed by the action pattern for the single measurement, and postponing the performing for at least one other measurement of the multiple measurements.

12. The computer system of claim 9, wherein when the measurement data is classified as a standard measurement, the method further comprises performing a default action, in response to the automatically determining.

13. The computer system of claim 9, wherein the measurement data is classified as a custom measurement, and the method further comprises pre-specifying one or more custom measurements for the service element.

14. The computer system of claim 9, wherein the measurement data is classified as an ad-hoc measurement, and the selecting comprises dynamically specifying one or more ad-hoc measurements for the service element during lifecycle usage of the service element.

15. The computer system of claim 9, wherein the collecting comprises collecting measurement data relating to one or more parameter of multiple service element instances, wherein each service element instance of the multiple service element instances is an instance of the same service element, and wherein the method further comprises identifying whether a service element instance comprises a measurement with an out-of-pattern deviation, and if so, informing the service element instance owner about the out-of-pattern deviation, wherein identifying an out-of-pattern deviation comprises comparing the measurement for the service element instance with corresponding measurements for multiple other service element instances and identifying the out-of-pattern deviation if the measurement deviates from the corresponding measurements by a defined amount.

16. The computer system of claim 9, wherein the selecting comprises selecting each of the measurement types and the collecting comprises collecting measurement data for each of the measurement types.

17. A computer program product for evaluating service elements, the computer program product comprising:
a storage medium readable by a processing circuit and storing instructions for execution by the processing circuit for performing a method comprising:
selecting a measurement type from among a standard measurement type, a custom measurement type and an ad-hoc measure type, the selecting including identifying information to be collected;
collecting measurement data relating to one or more parameters of a service element responsive to the use of the service element and responsive to the selecting, the service element being a discrete entity for which a customer is to be billed and which represents a service, and includes a feedback capability, the measurement data comprising a plurality of data collection measurements, each data collection measurement of the measurement data being the standard measurement type, the custom measurement type or the ad-hoc measurement type pursuant to the selecting, wherein a standard measurement comprises information relevant across multiple service elements, a custom measurement comprises information relevant to only the particular service element being evaluated, and an ad-hoc measurement comprises information dynamically obtained on the service element during a lifecycle usage of the service element, the ad-hoc measurement being a data collection measurement type which is first specified after deployment of the service element without additional change to the service element, wherein the standard measurement type, custom measurement type and ad-hoc measurement type are distinct types of data collection measurements;
storing the measurement data for the service element in a data structure for the service element, including each measurement's classification;
automatically determining, based on the stored measurement data, whether a change is to be made to at least one aspect of the service element, the automatically determining comprising automatically determining whether a particular measurement of the measurement data is within a corresponding established acceptable range, and if not, automatically obtaining an action pattern pre-specified for the particular measurement, and automatically performing a sequence of predefined activities prescribed by the action pattern for the particular measurement; and
wherein the action pattern is an automatic action pattern, and the sequence of predefined activities prescribed by the action pattern for the particular measurement comprise automatically updating a service element projection value for the particular measurement with the actual, particular measurement value, thereby automatically modifying the service element.

18. The computer program product of claim 17, wherein at least one parameter of the one or more parameters is associated with at least one area including at least one of deployment, delivery and lifecycle.

19. The computer program product of claim 17, wherein when multiple measurements of the measurement data are outside respective established acceptable ranges, the method further comprises:
sorting measurements of the measurement data based on a predefined measurement priority, and obtaining the action pattern for a single measurement of the multiple measurements, and performing the sequence of activities prescribed by the action pattern for the single measurement, and postponing the performing for at least one other measurement of the multiple measurements.

20. The computer program product of claim 17, wherein when the measurement data is classified as a standard measurement, the method further comprises performing a default action, in response to the automatically determining.

21. The computer program product of claim 17, wherein the measurement data is classified as a custom measurement, and the method further comprises pre-specifying one or more custom measurements for the service element.

22. The computer program product of claim 17, wherein the measurement data is classified as an ad-hoc measurement, and the selecting comprises dynamically specifying one or more ad-hoc measurements for the service element during lifecycle usage of the service element.

23. The computer program product of claim 17, wherein the collecting comprises collecting measurement data relating to one or more parameter of multiple service element instances, wherein each service element instance of the multiple service element instances is an instance of the same service element, and wherein the method further comprises identifying whether a service element instance comprises a measurement with an out-of-pattern deviation, and if so, informing the service element instance owner about the out-of-pattern deviation, wherein identifying an out-of-pattern deviation comprises comparing the measurement for the service element instance with corresponding measurements for multiple other service element instances and identifying the out-of-pattern deviation if the measurement deviates from the corresponding measurements by a defined amount.

24. The computer program product of claim 17, wherein the selecting comprises selecting each of the measurement types and the collecting comprises collecting measurement data for each of the measurement types.

* * * * *